US012499766B2

(12) United States Patent
Oe et al.

(10) Patent No.: US 12,499,766 B2
(45) Date of Patent: Dec. 16, 2025

(54) SAFE DRIVING SUPPORT SYSTEM AND SAFE DRIVING SUPPORT METHOD

(71) Applicants: TOYOTA JIDOSHA KABUSHIKI KAISHA, Toyota (JP); Nomura Research Institute, Ltd., Tokyo (JP)

(72) Inventors: Yoshihiro Oe, Nagoya (JP); Wataru Minoura, Nagoya (JP); Masatoshi Hayashi, Nisshin (JP); Yutaro Imamura, Nagoya (JP); Fumihiro Nasu, Nagoya (JP); Yuki Tatsumoto, Seto (JP); Takehiko Hashimoto, Tokyo (JP)

(73) Assignees: TOYOTA JIDOSHA KABUSHIKI KAISHA, Toyota (JP); Nomura Research Institute, Ltd., Tokyo (JP)

( * ) Notice: Subject to any disclaimer, the term of this patent is extended or adjusted under 35 U.S.C. 154(b) by 106 days.

(21) Appl. No.: 18/639,218

(22) Filed: Apr. 18, 2024

(65) Prior Publication Data

US 2024/0412636 A1 Dec. 12, 2024

(30) Foreign Application Priority Data

Jun. 9, 2023 (JP) ................................ 2023-095608

(51) Int. Cl.
*G08G 1/16* (2006.01)
*G08G 1/01* (2006.01)
*G08G 1/0967* (2006.01)

(52) U.S. Cl.
CPC ........... *G08G 1/164* (2013.01); *G08G 1/0116* (2013.01); *G08G 1/0125* (2013.01); *G08G 1/096775* (2013.01); *G08G 1/166* (2013.01)

(58) Field of Classification Search
CPC .... G08G 1/164; G08G 1/0116; G08G 1/0125; G08G 1/096775; G08G 1/166
See application file for complete search history.

(56) References Cited

U.S. PATENT DOCUMENTS 11,620,597 B1 * 4/2023 Sikora .................... G06V 10/82 382/103
2018/0281793 A1 * 10/2018 Terayama ......... B60W 30/0956
2019/0137991 A1 * 5/2019 Agarwal .............. G01C 21/383
2021/0011481 A1 * 1/2021 Cho .................... B60W 30/165
(Continued)

FOREIGN PATENT DOCUMENTS

JP 2006-329713 A 12/2006

*Primary Examiner* — Hussein Elchanti
(74) *Attorney, Agent, or Firm* — Sughrue Mion, PLLC

(57) ABSTRACT

In a safe driving support system, a data center is connected to a plurality of vehicles via a communication network. The data center stores a position of a first vehicle of which a G sensor detects that behavior of the vehicle has been disturbed when caution information is received from the first vehicle as a caution-needed spot in a storage device. The data center transmits data of a caution image extracted from data of images in a predetermined period before the caution information has been received out of the data of the images captured by a drive recorder of the first vehicle to a second vehicle approaching the caution-needed spot when the caution information is received. The display of the second vehicle having received the data of the caution image attracts attention by displaying the caution image before the second vehicle arrives at the caution-needed spot.

5 Claims, 5 Drawing Sheets

(56) References Cited

U.S. PATENT DOCUMENTS

| | | | | |
|---|---|---|---|---|
| 2021/0150902 | A1* | 5/2021 | Okubi | G08G 1/096741 |
| 2022/0075816 | A1* | 3/2022 | Yae | G06V 20/56 |
| 2022/0141426 | A1* | 5/2022 | Kim | H04N 7/183 348/148 |
| 2023/0192220 | A1* | 6/2023 | Na | G08B 31/00 701/32.2 |
| 2023/0227025 | A1* | 7/2023 | Kuramochi | B60W 30/09 701/301 |
| 2023/0311882 | A1* | 10/2023 | VanBlon | B60L 3/0076 701/22 |
| 2023/0373530 | A1* | 11/2023 | Kume | G08G 1/16 |
| 2023/0386333 | A1* | 11/2023 | Watanabe | G08G 1/09 |
| 2024/0182038 | A1* | 6/2024 | Kilaru | G08G 1/096708 |

* cited by examiner

SAFE DRIVING SUPPORT SYSTEM AND SAFE DRIVING SUPPORT METHOD

CROSS-REFERENCE TO RELATED APPLICATION

This application claims priority to Japanese Patent Application No. 2023-095608 filed on Jun. 9, 2023, incorporated herein by reference in its entirety.

BACKGROUND

1. Technical Field

The disclosure relates to a safe driving support system and a safe driving support method.

2. Description of Related Art

Japanese Unexamined Patent Application Publication No. 2006-329713 (JP 2006-329713 A) discloses a navigation device. When a caution-needed spot registered in advance is present on a route to a destination, the navigation device supports safe driving by notifying a driver beforehand that a vehicle will travel through the caution-needed spot.

SUMMARY

If a situation of a caution-needed spot is ascertained in advance, a driver can perform preventive driving. However, the driver cannot satisfactorily understand the situation of the caution-needed spot beforehand if the driver is only notified beforehand that a vehicle will travel through the caution-needed spot.

Configurations and advantageous effects of the disclosure will be described below. According to an aspect of the disclosure, there is provided a safe driving support system in which a data center including a storage device and a processing device is connected to a plurality of vehicles each including a detection device configured to detect that behavior of a vehicle has been disturbed, an imaging device configured to capture a front view of the vehicle, a navigation device, and a display device configured to display an image via a communication network. In the safe driving support system, the processing device is configured to receive position information of the plurality of vehicles from the navigation devices of the plurality of vehicles. The processing device is configured to receive data of images captured by the imaging devices of the plurality of vehicles and to store the data of the images in the storage device. The processing device is configured to identify a position of a first vehicle of which the detection device detects that behavior of the vehicle has been disturbed out of the plurality of vehicles when caution information is received from the first vehicle from the position information of the first vehicle and to store the position as a caution-needed spot in the storage device. The processing device is configured to store data of a caution image of the caution-needed spot extracted from the data of the images in a predetermined period before the caution information has been received out of the data of the images captured by the imaging device of the first vehicle and stored in the storage device in the storage device when the caution information is received. The processing device is configured to transmit data of the caution image stored in the storage device to a second vehicle approaching the caution-needed spot stored in the storage device out of the plurality of vehicles. The display device of the second vehicle having received the data of the caution image is configured to attract attention by displaying the caution image before the second vehicle arrives at the caution-needed spot.

According to another aspect of the disclosure, there is provided a safe driving support method that is performed in a safe driving support system in which a data center including a storage device and a processing device is connected to a plurality of vehicles each including a detection device configured to detect that behavior of a vehicle has been disturbed, an imaging device configured to capture a front view of the vehicle, a navigation device, and a display device configured to display an image via a communication network. The safe driving support method includes a first step of causing the processing device to receive position information of the plurality of vehicles from the navigation devices of the plurality of vehicles. The safe driving support method includes a second step of causing the processing device to receive data of images captured by the imaging devices of the plurality of vehicles and to store the data of the images in the storage device. The safe driving support method includes a third step of causing the processing device to identify a position of a first vehicle of which the detection device detects that behavior of the vehicle has been disturbed out of the plurality of vehicles when caution information is received from the first vehicle from the position information of the first vehicle and to store the position as a caution-needed spot in the storage device. The safe driving support method includes a fourth step of causing the processing device to store data of a caution image of the caution-needed spot extracted from the data of the images in a predetermined period before the caution information has been received out of the data of the images captured by the imaging device of the first vehicle and stored in the storage device in the storage device when the caution information is received. The safe driving support method includes a fifth step of causing the processing device to transmit data of the caution image stored in the storage device to a second vehicle approaching the caution-needed spot stored in the storage device out of the plurality of vehicles. The safe driving support method includes a sixth step of causing the display device of the second vehicle to attract attention by displaying the caution image before the second vehicle arrives at the caution-needed spot.

With the safe driving support system and the safe driving support method, it is possible to attract attention such that a driver can understand a situation of a caution-needed spot beforehand. Accordingly, the driver can understand the situation of the caution-needed spot beforehand and perform appropriate preventive driving.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a safe driving support system according to an embodiment will be described with reference to FIGS. 1 to 6.

Configuration of Safe Driving Support System 10

Figure 1:
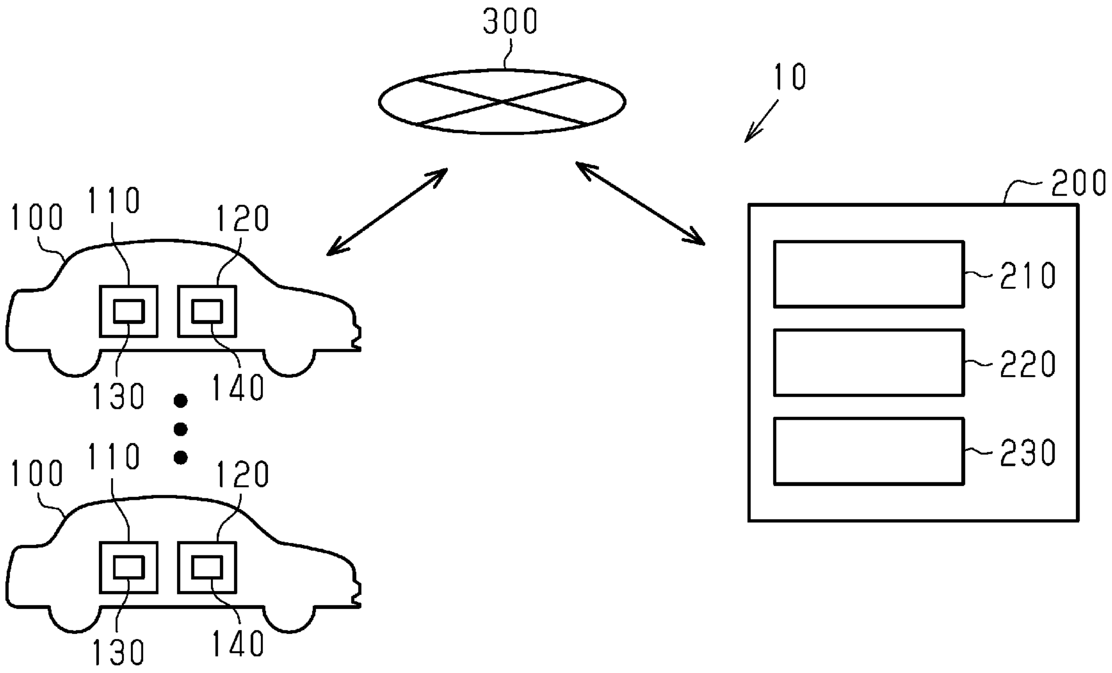
FIG. 1 is a diagram illustrating a configuration of a safe driving support system according to an embodiment.

As illustrated in FIG. 1, a safe driving support system 10 includes a plurality of vehicles 100 and a data center 200. The data center 200 is communicatively connected to the plurality of vehicles 100 via a communication network 300. Each vehicle 100 includes a drive recorder 110 which is an example of an imaging device and a navigation device 120.

Figure 2:
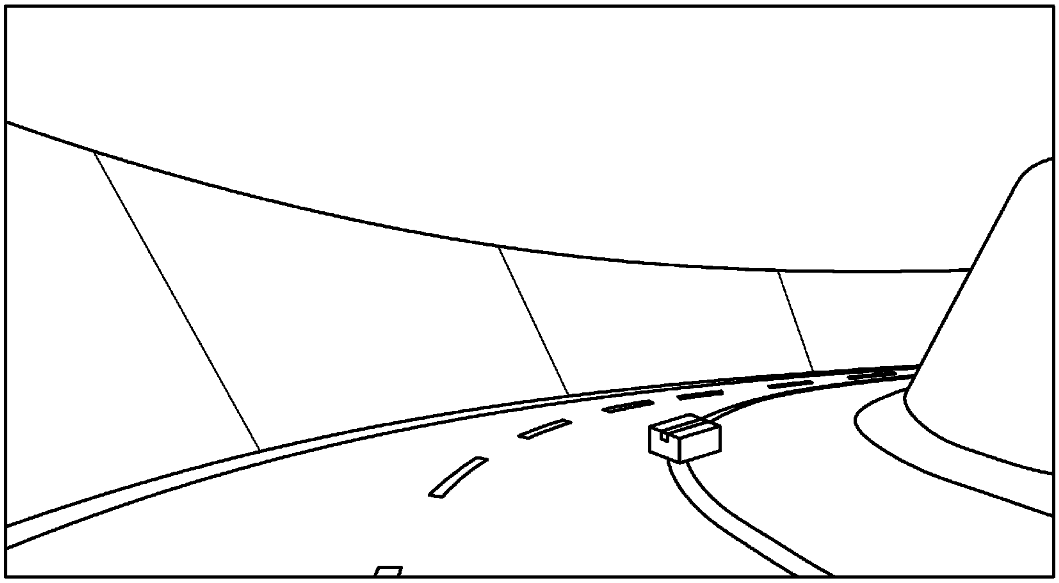
FIG. 2 is a diagram illustrating an example of an image of a drive recorder in the safe driving support system according to the embodiment.

FIG. 2 illustrates an example of an image which is captured by the drive recorder 110. The drive recorder 110 captures and records an image of a forward view from the vehicle 100 as seen from a driver's seat as illustrated in FIG. 2. The drive recorder 110 includes a G sensor 130. The G sensor 130 measures a magnitude of acceleration or deceleration of the vehicle 100 and detects that behavior of the vehicle 100 has been disturbed based on the measured magnitude of acceleration or deceleration.

The navigation device 120 includes a receiver of a satellite positioning system, a communication device, a display 140 which is an example of a display device that can display an image, and a storage device that stores data such as map information.

The drive recorder 110 and the navigation device 120 are connected to each other to exchange information. The drive recorder 110 stores date and time information of capturing of an image and position information of a spot in which the image has been captured along with data of the captured image in the storage device.

The data center 200 includes a communication device 230. The communication device 230 is realized by hardware such as a network adapter, various types of communication software, or combinations thereof. The communication device 230 is configured to realize wired or wireless communication via the communication network 300. The data center 200 can be constituted by a plurality of computers. For example, the data center 200 can be constituted by a plurality of server devices.

A spot in which it can be detected that behavior of a vehicle 100 has been disturbed includes, for example, a spot in which a disabled vehicle stops, a branch point of a highway, and a spot in which there is a signboard attracting attention in addition to a spot in which a fallen object is present on a road as illustrated in FIG. 2. That is, the spot in which it can be detected that behavior of a vehicle 100 has been disturbed may be a spot in which a driver needs to take caution. When a driver can understand a situation of such a caution-needed spot beforehand, the driver can perform preventive driving beforehand.

The safe driving support system 10 displays an image of each caution-needed spot captured by the drive records 110 of the plurality of vehicles 100 of which behavior has been disturbed on a display 140 of a vehicle 100 approaching the caution-needed spot before a plurality of vehicles 100 approaching the caution-needed spot arrives at the caution-needed spot. Accordingly, the safe driving support system 10 attracts attention of a driver of a vehicle 100 approaching the caution-needed spot.

More specifically, the data center 200 in the safe driving support system 10 receives position information from a plurality of vehicles 100. The data center 200 receives data of images captured by the drive recorders 110 of the plurality of vehicles 100 and stores the data of the images in the storage device 220. The data center 200 receives caution information of a first vehicle 101 out of the plurality of vehicles 100. The first vehicle 101 is a vehicle 100 of which the G sensor 130 detects that behavior of the vehicle 100 has been disturbed out of the plurality of vehicles 100. When caution information is received, the data center 200 identifies a position of the first vehicle 101 from the received position information and registers the position as a caution-needed spot by storing the position in the storage device 220. When caution information is received, the data center 200 extracts data of an image of the caution-needed spot from data of images in a predetermined period before the caution information is received out of the data of the images captured by the drive recorder 110 of the first vehicle 101 and stored in the storage device 220. The data center 200 stores the extracted data of the images of the caution-needed spot as data of a caution image in the storage device 220. The data center 200 transmits the data of the caution image stored in the storage device 220 to a second vehicle 102 out of the plurality of vehicles 100. The second vehicle 102 is a vehicle approaching the caution-needed spot stored in the storage device 220. The display 140 of the second vehicle 102 having received the data of a caution image attracts attention by displaying the caution image before the second vehicle 102 arrives at the caution-needed spot.

Transmission and Reception of Data of Images in Safe Driving Support System 10

Transmission and reception of images between the data center 200 and the first vehicle 101 and the second vehicle 102 will be described below with reference to FIG. 3.

Figure 3:
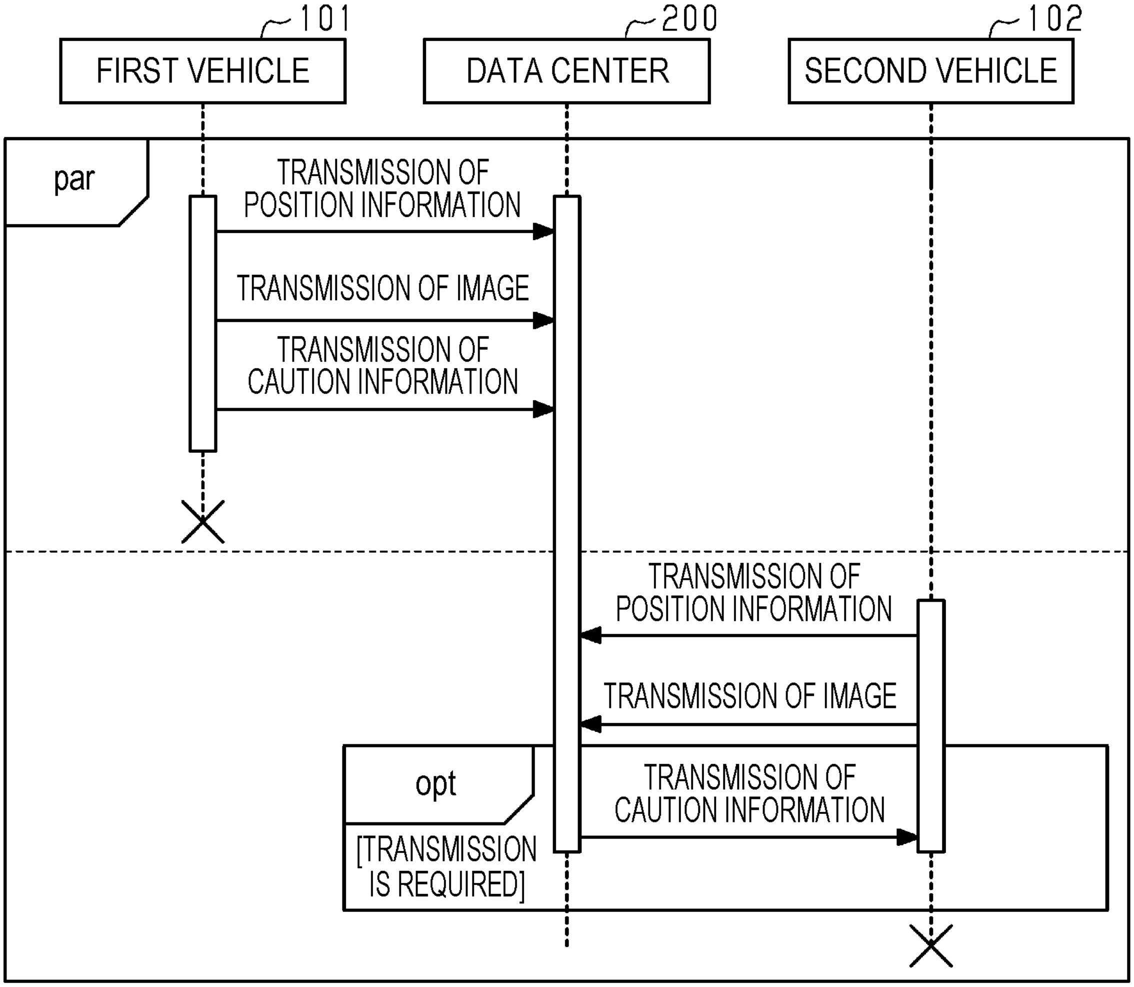
FIG. 3 is a sequence diagram illustrating process flows of a data center, a first vehicle, and a second vehicle in the safe driving support system according to the embodiment.

As illustrated in FIG. 3, the data center 200 in the safe driving support system 10 receives data of images from the vehicles 100. In the safe driving support system 10, the data center 200 transmits data of a caution image extracted from data of an image captured by the drive recorder 110 of the first vehicle 101 to the second vehicle 102. Accordingly, the safe driving support system 10 can provide data of a caution image captured by the drive recorder 110 of the first vehicle 101 to the second vehicle 102.

As illustrated in FIG. 3, a process of causing data of an image to be supplied to the data center 200 from the vehicles 100 and a process of causing the data center 200 to supply data of a caution image to the second vehicle 102 are performed in parallel.

As illustrated in FIG. 3, in the process of receiving data of images from the vehicles 100, each vehicle 100 transmits data of an image captured by the drive recorder 110 and position information indicating a current location of the vehicle 100 to the data center 200 periodically in a predetermined period. The data center 200 having received the data of an image stores the received data of an image in the storage device 220. As illustrated in the upper part of FIG. 3, the first vehicle 101 transmits caution information to the data center 200 when the G sensor 130 of the first vehicle 101 detects that behavior of the first vehicle 101 has been disturbed. The data center 200 having received caution information registers the position of the first vehicle 101 which can be identified from the received position information of the first vehicle 101 as a caution-needed spot by storing the position of the first vehicle 101 in the storage device 220. The data center 200 having received the caution information extracts data of an image of the registered caution-needed spot from the data of an image captured by the drive recorder 110 of the first vehicle 101 and stores the extracted data of an image as data of a caution image in the storage device 220.

As illustrated in the lower part of FIG. 3, in the process of supplying data of a caution image to a second vehicle 102, the data center 200 determines that data of a caution image needs to be transmitted to the second vehicle 102 when the second vehicle 102 approaches the registered caution-needed spot. The data center 200 determines whether there is a second vehicle 102 approaching the registered caution-needed spot based on the position information received from the vehicles 100. Then, when data of a caution image needs to be transmitted to the second vehicle 102, the data center 200 transmits data of a caution image of the caution-needed spot which the second vehicle 102 approaches to the second vehicle 102.

A process flow which is performed by a vehicle 100 and a process flow which is performed by the data center 200 in order to realize the attraction of attention using an image will be more specifically described below with reference to FIGS. 4 to 6.

Processes Performed by Navigation Device 120 of Vehicle 100

Figure 4:
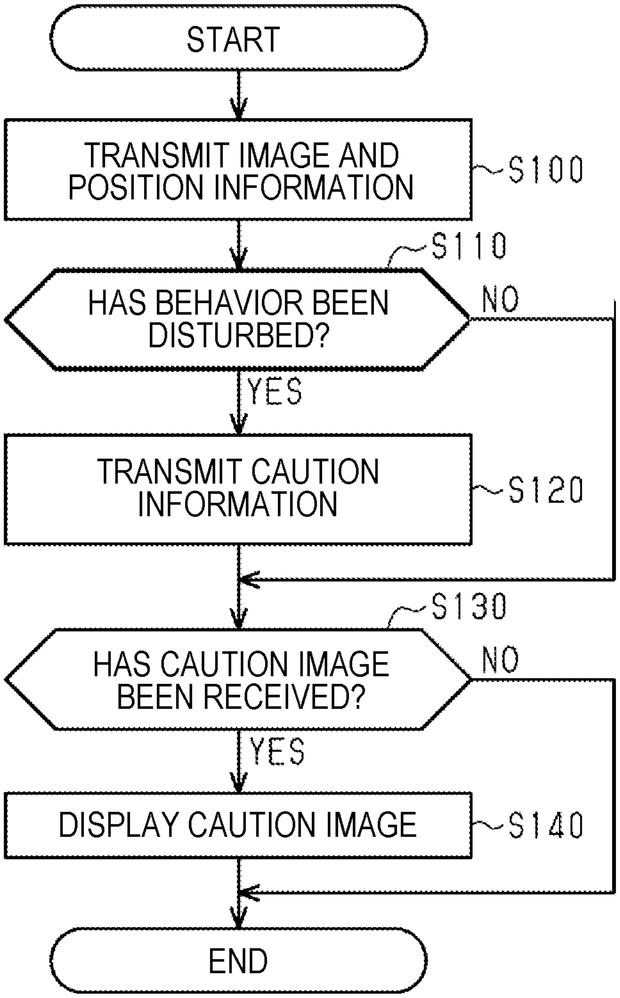
FIG. 4 is a flowchart illustrating a process flow which is performed by a navigation device of a vehicle in the safe driving support system according to the embodiment.

FIG. 4 illustrates a process flow which is performed by a vehicle 100. This series of processes are performed periodically in a predetermined period by the navigation device 120 of each vehicle 100. This series of processes are performed in parallel with route guidance using a satellite positioning system which is performed by the navigation device 120.

As illustrated in FIG. 4, when this series of processes start, the navigation device 120 first transmits position information for identifying data of an image and a current location of the vehicle 100 to the data center 200 in the process of Step S100. The data of an image to be transmitted is data of an image captured by the drive recorder 110 of the vehicle 100. The position information for identifying the current location of the vehicle 100 to be transmitted is information acquired from the receiver of the satellite positioning system of the navigation device 120.

Then, in the process of Step S110, the navigation device 120 determines whether behavior of the vehicle 100 has been disturbed. When the G sensor 130 of the drive recorder 110 of the vehicle 100 detects that behavior of the vehicle 100 has been disturbed, the navigation device 120 determines that behavior of the vehicle 100 has been disturbed. For example, the G sensor 130 of the vehicle 100 measures a magnitude of acceleration or deceleration of the vehicle 100 and detects that behavior of the vehicle 100 has been disturbed when the magnitude of acceleration or deceleration per unit time is greater than a predetermined value. That is, when the magnitude of acceleration or deceleration per unit time measured by the G sensor 130 of the vehicle 100 is greater than the predetermined value, the navigation device 120 determines that the acceleration of the first vehicle 101 has changed suddenly. When the navigation device 120 determines in the process of Step S110 that behavior of the vehicle 100 has been disturbed (Step S110: YES), the process flow proceeds to Step S120.

In the process of Step S120, the navigation device 120 transmits caution information to the data center 200. This process corresponds to the process of the first vehicle 101 illustrated in the upper part of FIG. 3. The caution information is information for identifying that behavior of the vehicle 100 has been disturbed. In addition, the caution information may include position information for identifying the position at which behavior of the vehicle 100 has been disturbed.

When the caution information is transmitted to the data center 200 through the process of Step S120 in this way, the process flow proceeds to Step S130. When the navigation device 120 determines in the process of Step S110 that behavior of the vehicle 100 has not been disturbed (Step S110: NO), the navigation device 120 performs the process of Step S130 without performing the process of Step S120.

Then, in the process of Step S130, the navigation device 120 determines whether data of a caution image has been received from the data center 200. When it is determined in the process of Step S130 that the navigation device 120 has received data of a caution image (Step S130: YES), the process flow proceeds to Step S140.

In the process of Step S140, the display 140 of the navigation device 120 attracts attention by displaying the caution image received from the data center 200. This process corresponds to a process of the second vehicle 102 illustrated in the lower part of FIG. 3. That is, the vehicle 100 may serve as the first vehicle 101 that supplies data of an image and transmits caution information and the second vehicle 102 that is supplied with data of a caution image depending on the situations. When the caution image is a video, the navigation device 120 may adjust a reproduction speed of the image according to the speed of the vehicle 100 such that the image captured at a position through which the vehicle 100 will pass in several seconds is displayed on the display 140 at the time of reproducing the caution image. Accordingly, a driver of the vehicle 100 can easily visually ascertain a situation before the vehicle 100 arrives at the caution-needed spot. When the caution image is displayed through the process of Step S140 in this way, the navigation device 120 ends the series of processes.

When it is determined in the process of Step S130 that the navigation device 120 has not received a caution image (Step S130: NO), the navigation device 120 ends the series of processes without performing the process of Step S140. That is, the display 140 of the navigation device 120 does not attract attention, and the series of process ends.

Processes Performed by Data Center 200 Periodically in Predetermined Period

Figure 5:
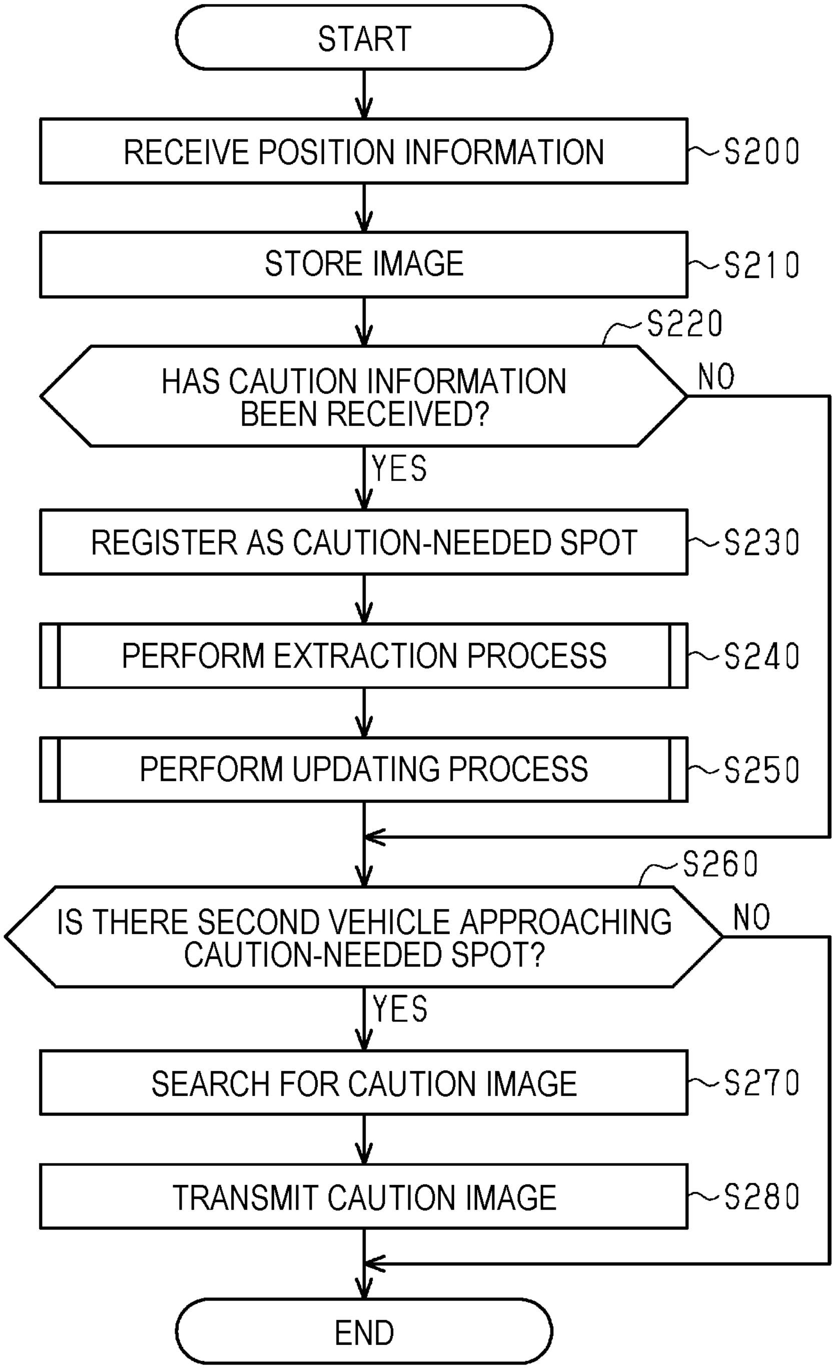
FIG. 5 is a flowchart illustrating a process flow which is periodically performed by the data center in the safe driving support system according to the embodiment.

FIG. 5 illustrates a process flow which is performed by the data center 200 periodically in a predetermined period. This series of processes are performed by the processing device 210 of the data center 200. This series of processes correspond to the process of the data center 200 illustrated in FIG. 3.

As illustrated in FIG. 5, when the series of processes start, the processing device 210 first receives position information of a plurality of vehicles 100 in the process of Step S200. At this time, the position information received by the processing device 210 is position information received from the first vehicle 101 and the second vehicle 102 in FIG. 3.

Then, in the process of Step S210, the processing device 210 stores data of received images in the storage device 220. The data of the images received by the processing device 210 is data of images received from the first vehicle 101 and the second vehicle 102 in FIG. 3.

Then, in the process of Step S220, the processing device 210 determines whether caution information has been received. The caution information received by the processing device 210 is caution information received from the first vehicle 101 in FIG. 3. When the processing device 210 determines in the process of Step S220 that caution information has been received from the first vehicle 101 (Step S220: YES), the process flow proceeds to Step S230.

In the process of Step S230, the processing device 210 identifies the position of the first vehicle 101 when the caution information has been received and registers the position as a caution-needed spot by storing the position in the storage device 220. At this time, the processing device 210 identifies the position of the first vehicle 101 when the caution information has been received based on the position information of the first vehicle 101 received in the process of Step S200.

Then, in the process of Step S240, the processing device 210 performs an extraction process. The extraction process is a process of extracting data of images of the caution-needed spot registered in the process of Step S230 as data of a caution image from the data of the images stored in the storage device 220 in the process of Step S210. For example, the processing device 210 extracts data of a caution image from data of images in a predetermined period before caution information is received out of the data of the images stored in the storage device 220 in the process of Step S210. It is preferable that the processing device 210 employ data of an image indicating better the situation of the caution-needed spot as the data of a caution image. For example, the extraction process may be a process of causing the processing device 210 to present images in the predetermined period before the caution information is received to an operator and allowing the operator to extract a part thereof as a caution image. For example, the extraction process may be a process of causing the processing device 210 to analyze data of caution images in the predetermined period before caution information is received using AI and to extract data of a caution image. The processing device 210 may extract the data of a caution image as still image data or may extract the data of a caution image as moving image data.

In the process of Step S240, the processing device 210 stores the extracted data of a caution image in the storage device 220. By causing the processing device 210 to perform such a process, the data of a caution image extracted from the data of the images captured in the drive recorder 110 of the first vehicle 101 before it is detected that behavior of the first vehicle 101 has been disturbed is stored in the storage device 220.

Then, in the process of Step S250, the processing device 210 performs an updating process. The updating process is a process of evaluating newly stored data of a caution image and updating data of a caution image to be provided to the second vehicle 102. The processing device 210 compares the newly stored data of a caution image with data of caution images of the same caution-needed spot stored in advance in the storage device 220 as the data of a caution image to be provided to the second vehicle 102. The processing device 210 updates the data of a caution image to be provided to the second vehicle 102 according to the result of comparison of such data of caution images. It is preferable that the processing device 210 employ data of an image in which a situation of the caution-needed spot is more clearly imaged. Accordingly, for example, the processing device 210 selects data in which the situation of the caution-needed spot is more clearly imaged as the data of a caution image to be provided to the second vehicle 102. It is preferable that the processing device 210 employ new data of a caution image. Accordingly, for example, the processing device 210 selects newer data as the data of a caution image to be provided to the second vehicle 102.

The updating process may be performed after a plurality of pieces of data of a caution image of the same caution-needed spot is stored in the storage device 220. In this case, the processing device 210 selects one piece of data of a caution image from the plurality of pieces of data of a caution image of the same caution-needed spot and updates the data of a caution image to be transmitted to the second vehicle 102. For example, the updating process may be a process of causing the processing device 210 to present data of caution images stored in the storage device 220 to an operator and allowing the operator to select one piece of data of a caution image. For example, the updating process may be a process of causing the processing device 210 to analyze data of caution images using AI and causing the AI to select data of a caution image based on the result of analysis.

When data of caution images is stored in the storage device 220 by performing the updating process of Step S250, the process flow proceeds to Step S260. When the processing device 210 determines in the process of Step S220 that caution information has not been received from the first vehicle 101 (Step S220: NO), the processing device 210 does not perform the processes of Steps S230 to S250. In this case, the processing device 210 performs the process of Step S260 without performing the processes of Steps S230 to S250.

Then, in the process of Step S260, the processing device 210 determines whether there is a second vehicle 102 approaching a caution-needed spot stored in the storage device 220. At this time, the processing device 210 determines whether there is a second vehicle 102 approaching the caution-needed spot for each caution-needed spot stored in the storage device 220. The processing device 210 identifies the position of the second vehicle 102 based on the position information received in the process of Step S200. At the same time, the processing device 210 identifies a distance between the identified position of the second vehicle 102 and each caution-needed spot stored in the storage device 220. For example, when the distance between the position of the second vehicle 102 and the caution-needed spot stored in the storage device 220 is less than a predetermined distance, the processing device 210 determines that there is a second vehicle 102 approaching the caution-needed spot. When the processing device 210 determines that there is a second vehicle 102 approaching the caution-needed spot (Step S260: YES), the process flow proceeds to Step S270.

Then, in the process of Step S270, the processing device 210 selects data of a caution image to be transmitted to the second vehicle 102 by searching for data of caution images of the caution-needed spot which the second vehicle 102 approaches out of a plurality of pieces of data of caution images stored in the storage device 220.

Then, in the process of Step S280, the processing device 210 transmits the data of a caution image to the second vehicle 102 approaching the caution-needed spot. The data of a caution image to be transmitted to the second vehicle 102 is the data of a caution image selected in the process of Step S270. Since the processing device 210 transmits data of a caution image to the second vehicle 102 approaching the caution-needed spot, the second vehicle 102 receives the data of a caution image at a timing before the second vehicle 102 arrives at the caution-needed spot. Accordingly, in the process of Step S140 of FIG. 4, the display 140 of the second vehicle 102 attracts attention before the second vehicle 102 arrives at the caution-needed spot by displaying the caution image when the data of a caution image is received. When the data of a caution image is transmitted to the second vehicle 102 through the process of Step S280 in this way, the processing device 210 ends this series of processes.

When the processing device 210 determines in the process of Step S260 that there is no second vehicle 102 approaching the caution-needed spot (Step S260: NO), the processing device 210 does not perform the process of Step S270 and the process of Step S280. At this time, the processing device 210 ends this series of processes without performing the process of Step S270 and the process of Step S280. That is, when there is no second vehicle 102 approaching the caution-needed spot, the processing device 210 ends this series of processes without transmitting the data of a caution image to the second vehicle 102.

Figure 6:
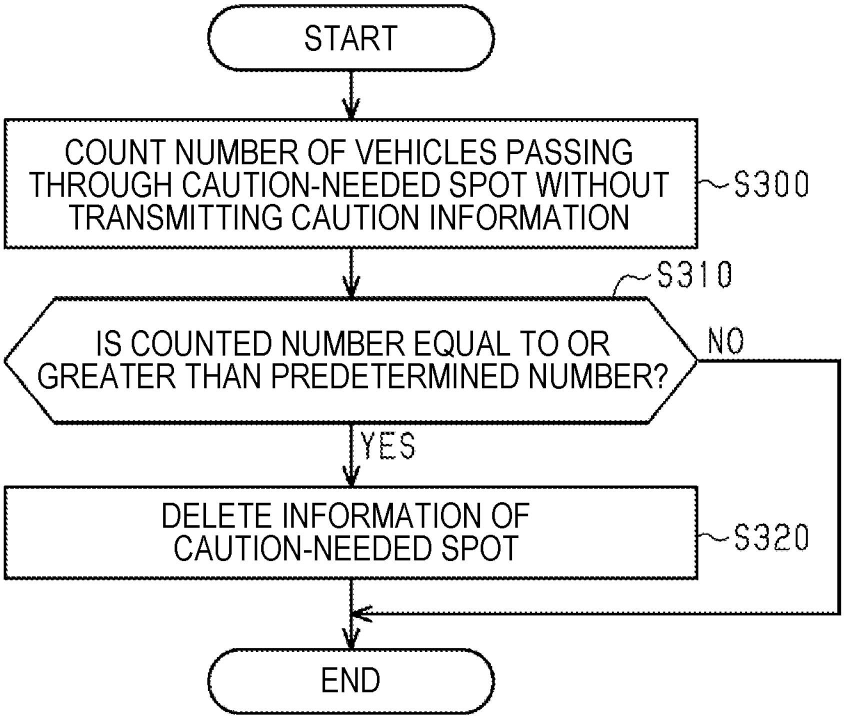
FIG. 6 is a flowchart illustrating a process flow which is performed by the data center in the safe driving support system according to the embodiment when a vehicle passes through a caution-needed spot.

Process Performed by Data Center 200 when Vehicle 100 Passes Through Caution-Needed Spot FIG. 6 is a flowchart illustrating a process flow which is performed by the data center 200 when a vehicle 100 passes through each registered caution-needed spot. This series of processes are performed by the processing device 210 of the data center 200. This series of processes correspond to the process of the data center 200 illustrated in FIG. 3.

As illustrated in FIG. 6, when this series of processes start, the processing device 210 first counts the number of vehicles 100 having passed through a caution-needed spot without transmitting caution information to the data center 200 in the process of Step S300. The processing device 210 counts the number of vehicles 100 having passed through a caution-needed spot without transmitting caution information for each caution-needed spot stored in the storage device 220 based on position information received from a plurality of vehicles 100 and information indicating whether caution information has been received. The processing device 210 stores the counted number of vehicles 100 in the storage device 220.

Then, in process of Step S310, the processing device 210 determines whether the number of vehicles 100 having passed through a caution-needed spot without transmitting caution information is equal to or greater than a predetermined number for each caution-needed spot stored in the storage device 220. At this time, the processing device 210 determines whether the number of vehicles 100 having passed through a caution-needed spot without transmitting caution information is equal to or greater than the predetermined number based on the number of vehicles 100 stored in the storage device 220 in the process of Step S300. When the processing device 210 determines that the number of vehicles 100 having passed through a caution-needed spot without transmitting caution information is equal to or greater than the predetermined number for each caution-needed spot stored in the storage device 220 (Step S310: YES), the process flow proceeds to Step S320.

Then, in the process of Step S320, the processing device 210 deletes information of a caution-needed spot in which the number of vehicles 100 having passed through the caution-needed spot without transmitting caution information is equal to or greater than the predetermined number and which is stored in the storage device 220. Specifically, the processing device 210 deletes a caution-needed spot in which the number of vehicles 100 having passed through the caution-needed spot without transmitting caution information is equal to or greater than the predetermined number out of caution-needed spots stored in the storage device 220 in the process of Step S230 in FIG. 5. That is, the processing device 210 deletes a caution-needed spot in which the number of vehicles 100 having passed through the caution-needed spot without transmitting caution information is equal to or greater than the predetermined number out of the registered caution-needed spots. When data of a caution image of the deleted caution-needed spot is stored in the storage device 220, the processing device 210 deletes the data of a caution image of the deleted caution-needed spot. When the information of a caution-needed spot in which the number of vehicles 100 having passed through the caution-needed spot without transmitting caution information is equal to or greater than the predetermined number is deleted through the process of Step S320 in this way, the processing device 210 ends this series of processes.

When the processing device 210 determines in the process of Step S310 that the number of vehicles 100 having passed through a caution-needed spot without transmitting caution information is not equal to nor greater than the predetermined number (Step S310: NO), the processing device 210 does not perform the process of Step S320. In this case, the processing device 210 ends this series of processes without performing the process of Step S320. That is, when it is determined for each caution-needed spot stored in the storage device 220 that the number of vehicles 100 having passed through a caution-needed spot without transmitting caution information is not equal to or nor greater than the predetermined number, the processing device 210 ends this series of processes without deleting information of the caution-needed spot.

Operation of Embodiment

In the safe driving support system 10, the processing device 210 of the data center 200 receives position information of a plurality of vehicles 100 from the navigation device 120 of each of the plurality of vehicles 100 through the process of Step S200 in the series of processes described above with reference to FIG. 5. This process described above with reference to FIG. 5 is a first step of the safe driving support method performed by the safe driving support system 10.

The processing device 210 receives data of images captured by the drive recorder 110 of each of the plurality of vehicles 100 and stores the received data of the images in the storage device 220 through the process of Step S210 in the series of processes described above with reference to FIG. 5. This process described above with reference to FIG. 5 is a second step of the safe driving support method performed by the safe driving support system 10.

The processing device 210 identifies the position of the first vehicle 101 when caution information has been received from the first vehicle 101 based on the position information of the first vehicle 101 through the process of Step S230 in the series of processes described above with reference to FIG. 5. The first vehicle 101 is a vehicle 100 in which the G sensor 130 detects that behavior of the vehicle 100 has been disturbed out of the plurality of vehicles 100. The processing device 210 stores the identified position of the first vehicle 101 as a caution-needed spot in the storage device 220. This process described above with reference to FIG. 5 is a third step of the safe driving support method performed by the safe driving support system 10.

The processing device 210 stores data of a caution image of the caution-needed spot in the storage device 220 when caution information is received through the process of Step S240 in the series of processes described above with reference to FIG. 5. The data of a caution image is data extracted from data of images in a predetermined period before caution information captured by the drive recorder 110 of the first vehicle 101 has been received and stored in the storage device 220. This process described above with reference to FIG. 5 is a fourth step of the safe driving support method performed by the safe driving support system 10.

The processing device 210 transmits data of a caution image stored in the storage device 220 to a second vehicle 102 approaching the caution-needed spot out of the plurality of vehicles 100 through the process of Step S280 in the series of processes described above with reference to FIG. 5. This process described above with reference to FIG. 5 is a fifth step of the safe driving support method performed by the safe driving support system 10.

The display 140 of the second vehicle 102 attracts attention by displaying a caution image before the second vehicle 102 arrives at the caution-needed spot through the process of Step S140 in the series of processes described above with reference to FIG. 4. This process described above with reference to FIG. 4 is a sixth step of the safe driving support method performed by the safe driving support system 10.

In this way, the safe driving support system 10 performs the safe driving support method including the first step, the second step, the third step, the fourth step, the fifth step, and the sixth step. By performing this safe driving support method, the safe driving support system 10 registers a position at which behavior of a vehicle 100 has been disturbed as a caution-needed spot when behavior of the vehicle 100 has been disturbed. Then, the safe driving support system 10 extracts data of a caution image from data of images captured by the drive recorder 110 of the first vehicle 101 in a predetermined period before behavior of the vehicle has been disturbed. Then, the safe driving support system 10 transmits the extracted data of a caution image to the second vehicle 102 approaching the caution-needed spot. Then, in the safe driving support system 10, the display 140 of the second vehicle 102 having received the data of a caution image attracts attention by displaying the caution image before the second vehicle 102 arrives at the caution-needed spot.

Advantages of Embodiment (1) The safe driving support system 10 can attract attention such that a driver can ascertain a situation of a caution-needed spot beforehand. Accordingly, the driver can ascertain the situation of the caution-needed spot beforehand and perform appropriate preventive driving.

(2) The display 140 of the second vehicle 102 adjusts a reproduction speed of a video according to a speed of the second vehicle 102 such that an image captured at a position at which the vehicle will arrive after a predetermined time elapses is displayed when attention is attracted by reproducing a video of a caution image. Accordingly, the driver of the second vehicle 102 can easily visually ascertain a situation up to a position at which the vehicle will arrive after a predetermined time elapses.

(3) The processing device 210 selects data of a caution image to be transmitted to the second vehicle 102 from a plurality of pieces of data of caution images of the same caution-needed spot stored in the storage device 220 and updates the data of a caution image to be transmitted to the second vehicle 102. Since the safe driving support system 10 updates the data of a caution image, it is possible to allow a driver to ascertain a situation of the caution-needed spot based on an appropriate caution image.

(4) The processing device 210 deletes information of a caution-needed spot in which the number of vehicles 100 having passed through the caution-needed spot without transmitting caution information to the data center 200 is equal to or greater than the predetermined number and which is stored in the storage device 220. That is, when the number of vehicles 100 passing through the caution-needed spot without disturbing behavior is equal to or greater than the predetermined number, the processing device 210 deletes information of the caution-needed spot. When the number of vehicles 100 passing through the caution-needed spot without disarranging behavior is equal to or greater than the predetermined number, there is a high likelihood that the situation of the caution-needed spot will change to a safe situation. At this time, by causing the processing device 210 to delete information of the caution-needed spot, a caution image is not transmitted to a second vehicle 102 even when there is a second vehicle 102 approaching the caution-needed spot of which information has been deleted. Accordingly, it is possible to curb continuous attraction of attention even if the situation of the caution-needed spot is a safe situation.

(6) In the safe driving support method, when behavior of a vehicle 100 has been disturbed, a position at which the behavior has been disturbed is registered as a caution-needed spot, and data of a caution image is extracted from data of images captured by the drive recorder 110 of the first vehicle 101 in a predetermined period before the behavior has been disturbed. Then, the extracted data of a caution image is transmitted to a second vehicle 102 approaching the caution-needed spot. The display 140 of the second vehicle 102 having received the data of a caution image attracts attention by displaying the caution image before the second vehicle 102 arrives at the caution-needed spot. Accordingly, with the safe driving support method can attract attention such that a driver can ascertain a situation of the caution-needed spot beforehand. Accordingly, the driver can ascertain the situation of the caution-needed spot beforehand and perform appropriate preventive driving.

Modified Examples

This embodiment can be modified as follows. The embodiment and the following modified examples can be combined unless technical conflictions arise.

Data of an image captured by the drive recorder 110 which is an example of an imaging device is transmitted from each of a plurality of vehicles 100 to the data center 200. Accordingly, for example, a configuration in which the navigation device 120 inquires of a driver about whether transmission of data of an image is to be permitted when the navigation device 120 starts and the data of an image is transmitted when the driver has permitted the transmission may be employed.

Each of the plurality of vehicles 100 may serve as the first vehicle 101 or may serve as the second vehicle 102. On the other hand, the vehicles 100 may include a vehicle only being supplied with a caution image, that is, a vehicle 100 only serving as the second vehicle 102. In this case, the vehicle 100 only being supplied with a caution image may not include the drive recorder 110.

The plurality of vehicles 100 may include a vehicle only supplying an image.

In the safe driving support system 10, a caution image is displayed on the display 140 of the navigation device 120 of the second vehicle 102. On the other hand, a caution image may be displayed on a display device other than the display 140 of the navigation device 120 in the second vehicle 102. An example of the display device other than the display 140 of the navigation device 120 is a head-up display that displays an image on a front windshield.

When a caution image is being displayed on the display 140 of the second vehicle 102, speech representing that a caution image is being displayed may be output from the navigation device 120.

In the safe driving support system 10, a detection device that detects that behavior of a vehicle 100 has been disturbed is the G sensor 130. On the other hand, the detection device that detects that behavior of a vehicle 100 has been disturbed may be a device other than the G sensor 130. For example, the detection device may be a steering angle sensor that measures a change in angle of a steering wheel of the vehicle 100. For example, the detection device may be a pedal stroke sensor that measures a change in depression of a brake pedal of the vehicle 100. When the steering angle sensor or the pedal stroke sensor is employed as the detection device and the magnitude of a change per unit time is greater than a predetermined value, it can be detected that behavior of the vehicle 100 has been disturbed. That is, when the magnitude of a change per unit time is greater than the predetermined value, caution information can be transmitted from the first vehicle 101 to the data center 200. The detection device may be constituted by combining some or all of the G sensor 130, the steering angle sensor, and the pedal stroke sensor.

The processing device 210 of the data center 200 transmits data of a caution image to a second vehicle 102 approaching the caution-needed spot stored in the storage device 220 out of a plurality of vehicles 100. On the other hand, the processing device 210 of the data center 200 may determine whether a caution-needed spot is included in a route to a guided destination when route guidance is performed by the navigation device 120 of a vehicle 100. Accordingly, when a caution-needed spot is included in the route guided by the navigation device 120 of the vehicle 100, the processing device 210 can determine that there is a second vehicle 102 approaching the caution-needed spot in the process of Step S260 of FIG. 5. As a result, the processing device 210 may transmit data of a caution image to the second vehicle 102 in which the caution-needed spot is included in the route guided by the navigation device 120 out of the plurality of vehicles 100.

In the safe driving support system 10, an image transmitted from each of a plurality of vehicles 100 to the data center 200 is an image captured by the drive recorder 110. On the other hand, the image transmitted from each of the plurality of vehicles 100 to the data center 200 may be an image captured by an imaging device other than the drive recorder 110. An example of the imaging device other than the drive recorder 110 is an onboard camera used for driving support.

The processing device 210 counts the number of vehicles 100 passing through a caution-needed spot without disturbing behavior and deletes information of the caution-needed spot when the counted number of vehicles 100 is equal to or greater than a predetermined number. On the other hand, for example, the processing device 210 may count a ratio of the number of vehicles 100 having passed through the caution-needed spot without transmitting caution information to the data center to the total number of vehicles 100 passing through the caution-needed spot every predetermined period. Then, when the counted ratio is equal to or less than a predetermined ratio, information of the caution-needed spot stored in the storage device 220 may be deleted.

The order of steps included in the safe driving support method is not particularly limited. The order of steps may be changed as long as the safe driving support method can be realized. For example, the processing device 210 may perform the second step before performing the first step.

What is claimed is:

1. A safe driving support system in which a data center including a storage device and a processing device is connected to a plurality of vehicles each including a detection device configured to detect that behavior of a vehicle has been disturbed, an imaging device configured to capture a front view of the vehicle, a navigation device, and a display device configured to display an image via a communication network, wherein the processing device is configured to perform:

receiving position information of the plurality of vehicles from the navigation devices of the plurality of vehicles;

receiving data of images captured by the imaging devices of the plurality of vehicles and storing the data of the images in the storage device;

identifying a position of a first vehicle of which the detection device detects that behavior of the vehicle has been disturbed out of the plurality of vehicles when caution information is received from the first vehicle from the position information of the first vehicle and storing the position as a caution-needed spot in the storage device;

storing data of a caution image of the caution-needed spot extracted from the data of the images in a predetermined period before the caution information has been received out of the data of the images captured by the imaging device of the first vehicle and stored in the storage device in the storage device when the caution information is received; and transmitting data of the caution image stored in the storage device to a second vehicle approaching the caution-needed spot stored in the storage device out of the plurality of vehicles, and wherein the display device of the second vehicle having received the data of the caution image attracts attention by displaying the caution image before the second vehicle arrives at the caution-needed spot.

2. The safe driving support system according to claim 1, wherein the display device of the second vehicle adjusts a reproduction speed of the caution image according to a speed of the second vehicle such that an image captured at a spot at which the second vehicle is to arrive after a predetermined period has elapsed is displayed when the attracting of attention is performed by reproducing a video of the caution image.

3. The safe driving support system according to claim 1, wherein the processing device is configured to further perform:

storing data of a plurality of caution images of the same caution-needed spot identified based on the position information received from the navigation devices of the plurality of first vehicles in the storage device; and selecting data of the caution data to be transmitted to the second vehicle out of the data of the plurality of caution images of the same caution-needed spot stored in the storage device and updating the data of the caution image to be transmitted to the second vehicle.

4. The safe driving support system according to claim 3, wherein the processing device is configured to further perform counting the number of vehicles passing the caution-needed spot without transmitting the caution information to the data center and deleting information of the caution-needed spot in which the counted number is equal to or greater than a predetermined number from the storage device.

5. A safe driving support method that is performed in a safe driving support system in which a data center including a storage device and a processing device is connected to a plurality of vehicles each including a detection device configured to detect that behavior of a vehicle has been disturbed, an imaging device configured to capture a front view of the vehicle, a navigation device, and a display device configured to display an image via a communication network, the safe driving support method comprising:

a first step of causing the processing device to receive position information of the plurality of vehicles from the navigation devices of the plurality of vehicles;

a second step of causing the processing device to receive data of images captured by the imaging devices of the plurality of vehicles and to store the data of the images in the storage device;

a third step of causing the processing device to identify a position of a first vehicle of which the detection device detects that behavior of the vehicle has been disturbed out of the plurality of vehicles when caution information is received from the first vehicle from the position information of the first vehicle and to store the position as a caution-needed spot in the storage device;

a fourth step of causing the processing device to store data of a caution image of the caution-needed spot extracted from the data of the images in a predetermined period before the caution information has been received out of the data of the images captured by the imaging device of the first vehicle and stored in the storage device in the storage device when the caution information is received;

a fifth step of causing the processing device to transmit data of the caution image stored in the storage device to a second vehicle approaching the caution-needed spot stored in the storage device out of the plurality of vehicles; and a sixth step of causing the display device of the second vehicle to attract attention by displaying the caution image before the second vehicle arrives at the caution-needed spot.

* * * * *